United States Patent
Onishi et al.

(10) Patent No.: US 9,452,405 B2
(45) Date of Patent: Sep. 27, 2016

(54) LIQUID-FUEL SYNTHESIZING METHOD AND LIQUID-FUEL SYNTHESIZING APPARATUS

(75) Inventors: Yasuhiro Onishi, Tokyo (JP); Akihiko Hirama, Yokohama (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 366 days.

(21) Appl. No.: 12/998,201

(22) PCT Filed: Sep. 25, 2009

(86) PCT No.: PCT/JP2009/004883
§ 371 (c)(1),
(2), (4) Date: May 3, 2011

(87) PCT Pub. No.: WO2010/038395
PCT Pub. Date: Apr. 8, 2010

(65) Prior Publication Data
US 2011/0201697 A1    Aug. 18, 2011

(30) Foreign Application Priority Data
Sep. 30, 2008    (JP) .................... 2008-253213

(51) Int. Cl.
*B01J 8/22* (2006.01)
*C10G 2/00* (2006.01)
*B01J 8/18* (2006.01)

(52) U.S. Cl.
CPC ............ *B01J 8/22* (2013.01); *B01J 8/1827* (2013.01); *C10G 2/32* (2013.01); *C10G 2/342* (2013.01); *B01J 2208/003* (2013.01); *B01J 2208/00274* (2013.01); *B01J 2208/00911* (2013.01)

(58) Field of Classification Search
CPC   B01J 8/22; B01J 8/1827; B01J 2208/00911;
C10G 2/342; C10G 2/344
USPC ........ 422/140, 606, 604, 231, 234; 518/700, 518/702
See application file for complete search history.

(56) References Cited

U.S. PATENT DOCUMENTS 3,785,779 A * 1/1974 Li et al. .................. 422/231
5,252,613 A * 10/1993 Chang et al. ............. 518/700

(Continued)

FOREIGN PATENT DOCUMENTS

CN         101010280         8/2007
CN         101092350         12/2007

(Continued)

OTHER PUBLICATIONS

International Search Report dated Oct. 27, 2009 issued in corresponding PCT Application No. PCT/JP2009/004883.

(Continued)

*Primary Examiner* — Lessanework Seifu
(74) *Attorney, Agent, or Firm* — Kenyon & Kenyon LLP

(57) ABSTRACT

A liquid-fuel synthesizing method includes a synthesizing step of synthesizing liquid fuels by making a synthesis gas including a carbon monoxide gas and a hydrogen gas as the main components and a slurry having solid catalyst particles suspended in a liquid react with each other in a reactor, and a synthesis gas supply step of supplying the synthesis gas to the reactor from a plurality of supply devices provided in the reactor so as to have different heights.

6 Claims, 4 Drawing Sheets

(56) References Cited

U.S. PATENT DOCUMENTS

| | | | |
|---|---|---|---|
| 5,763,716 A | 6/1998 | Benham et al. | |
| 6,160,026 A | 12/2000 | Dai et al. | |
| 6,517,706 B1 * | 2/2003 | Pruden et al. | 208/108 |
| 2006/0047142 A1 * | 3/2006 | Wonders et al. | 562/414 |
| 2007/0155986 A1 * | 7/2007 | Wonders et al. | 562/410 |

FOREIGN PATENT DOCUMENTS

| | | |
|---|---|---|
| CN | 101157606 | 4/2008 |
| GB | 2412612 | 10/2005 |
| GB | 2458584 | 9/2009 |
| JP | 2007-530275 | 11/2007 |
| JP | 2007-533662 | 11/2007 |
| JP | 2008-532759 | 8/2008 |
| WO | 2005/084790 | 9/2005 |
| WO | WO 2005/094979 | 10/2005 |
| WO | WO 2005/103211 | 11/2005 |
| WO | 2006/097904 | 9/2006 |
| WO | WO 2006/097905 | 9/2006 |
| WO | 2007/114271 | 10/2007 |

OTHER PUBLICATIONS

European Search Report, dated Feb. 6, 2012, issued in corresponding European application No. 09817438.6.

Chinese Office Action dated Aug. 1, 2013 issued in corresponding Chinese Application No. 200980138039.7. [With English Translation].

* cited by examiner

LIQUID-FUEL SYNTHESIZING METHOD AND LIQUID-FUEL SYNTHESIZING APPARATUS

TECHNICAL FIELD

The present invention relates to a liquid-fuel synthesizing method and liquid-fuel synthesizing apparatus for synthesizing liquid fuels from a hydrocarbon feedstock, such as a natural gas.

This application is a national stage application of International Application No. PCT/JP2009/004883, filed Sep. 25, 2009, which claims priority to Japanese Patent Application No. 2008-253213, filed Sep. 30, 2008, the content of which is incorporated herein by reference.

BACKGROUND ART

As one of the methods for synthesizing liquid fuels from a natural gas, a GTL (Gas to Liquids: liquid fuel synthesis) technique of reforming a natural gas to produce a synthesis gas containing a carbon monoxide gas (CO) and a hydrogen gas ($H_2$) as the main components, synthesizing liquid hydrocarbons by the Fischer-Tropsch synthesis reaction (hereinafter referred to as "FT synthesis reaction"), with this synthesis gas as a source gas, and further hydrogenating and refining the liquid hydrocarbons to produce liquid fuel products, such as naphtha (raw gasoline), kerosene, gas oil, and wax, has recently been developed.

In an FT synthesis reaction step, for example, a reactor called a bubble column slurry bed type reactor is used as one of the reactors. This bubble column slurry bed type reactor has a configuration in which a slurry consisting of a catalyst and medium oil is contained inside a column type container, and a sparger is provided at the bottom of the reactor. In the FT synthesis reaction step, a synthesis gas is supplied into the reactor from the bottom thereof as bubbles via the sparger, passes through the inside of the slurry from a lower part to an upper part within the reactor, and undergoes a synthesis reaction in a suspended state.

CITATION LIST

Patent Document

[Patent Document 1] PCT Japanese Translation Patent Publication No. 2007-533662

SUMMARY OF THE INVENTION

Problem that the Invention is to Solve

However, in the above FT synthesis reaction step, the synthesis gas supplied from the bottom of the reactor undergoes a synthesis reaction gradually while passing through the slurry from the lower part of the slurry to the upper part thereof, and the partial pressure of the synthesis gas decreases. For this reason, compared with the lower part of the slurry, there is a problem in that the reaction rate of the synthesis reaction may decrease, and the productivity of liquid fuels may be lowered in the upper part of the slurry.

The present invention was made in view of such a problem, and the object thereof is to provide a liquid-fuel synthesizing method and a liquid-fuel synthesizing apparatus which can synthesize liquid fuels efficiently.

Means for Solving the Problem

The liquid-fuel synthesizing method according to the present invention includes a synthesizing step of synthesizing liquid fuels by making a synthesis gas including a carbon monoxide gas and a hydrogen gas as the main components and a slurry having solid catalyst particles suspended in a liquid react with each other in a reactor, and a synthesis gas supply step of supplying the synthesis gas to the reactor from a plurality of supply devices provided in the reactor so as to have different heights.

A liquid-fuel synthesizing apparatus includes a reactor which synthesizes liquid fuels by making a synthesis gas including a carbon monoxide gas and a hydrogen gas as the main components and a slurry having solid catalyst particles suspended in a liquid react with each other in a reactor, and a plurality of supply devices which is provided in the reactor so as to have different heights, and which supplies the synthesis gas to the reactor.

According to the present invention, since the synthesis gas is supplied to the reactor from the plurality of supply device provided in the reactor so as to have different heights, the synthesis gas with sufficient partial pressure can be spread even in the upper part of the reactor compared with the case where the synthesis gas is supplied only from the bottom of the reactor. Thereby, since a synthesis reaction can be uniformly performed throughout the whole reactor, it is possible to synthesize liquid fuels efficiently. In addition, in the present invention, since the synthesis gas can be uniformly supplied to the whole reactor and liquid fuels can be efficiently synthesized, the reactor itself can be compact.

In the above liquid-fuel synthesizing method and liquid-fuel synthesizing apparatus, the setting height and number of the plurality of supply devices may be determined so that the partial pressure of the synthesis gas within the reactor becomes uniform.

The plurality of supply devices may include a first supply device provided at the bottom of the reactor, and a plurality of second supply devices provided in a position higher than the first supply device.

Each of the second supply devices may have a plurality of supply ports provided on a cross-section of the reactor.

In this case, since the synthesis gas is supplied to the reactor from the plurality of supply ports even in the direction of the cross-section of the reactor, the partial pressure of the synthesis gas in the whole reactor can be made more uniform.

The flow rate of the synthesis gas supplied from each of the second supply device may be individually adjusted.

In this case, since the flow rate of the synthesis gas supplied from each of the second supply devices can be individually adjusted, for example, according to the environment around the reactor, flexible operation is possible. The flow rate of the synthesis gas supplied from each of the second supply devices may be determined on the basis of the gas superficial velocity in the reactor. As for the device which determines the flow rate in advance, for example, experiments or simulations are performed, and the flow rate of the synthesis gas supplied from each of the second supply devices can be determined on the basis of the results of the experiments or simulations.

The second supply device may include a trunk part provided so as to pass through the center of the reactor, and a plurality of annular tubes which is connected to the trunk part, is annularly formed concentrically with the reactor, and differs in diameter, and the plurality of supply ports may be formed in the plurality of internal tubes. Further, the second supply device may include a trunk part provided so as to pass through the center of the reactor, and a plurality of branch parts which extends horizontally from the trunk part, and the plurality of supply ports may be formed in the plurality of branch parts.

In the synthesis gas supply step of the liquid-fuel synthesizing method, the synthesis gas which has been unreacted in the synthesizing step may be recycled and supplied to the reactor. In this case, since the unreacted synthesis gas can be reused, the hydrocarbon feedstock can be efficiently utilized.

In the synthesis gas supply step, the synthesis gas may be supplied so that the gas superficial velocity in the reactor is within a range of 0.04 m/s to 0.3 m/s in the synthesizing step, and the synthesis gas may be supplied so that the gas superficial velocity in the reactor is within a range of 0.1 m/s to 0.2 m/s in the synthesizing step.

Advantage of the Invention

According to the present invention, it is possible to synthesize liquid fuels efficiently.

DESCRIPTION OF EMBODIMENTS

First Embodiment

Figure 1:
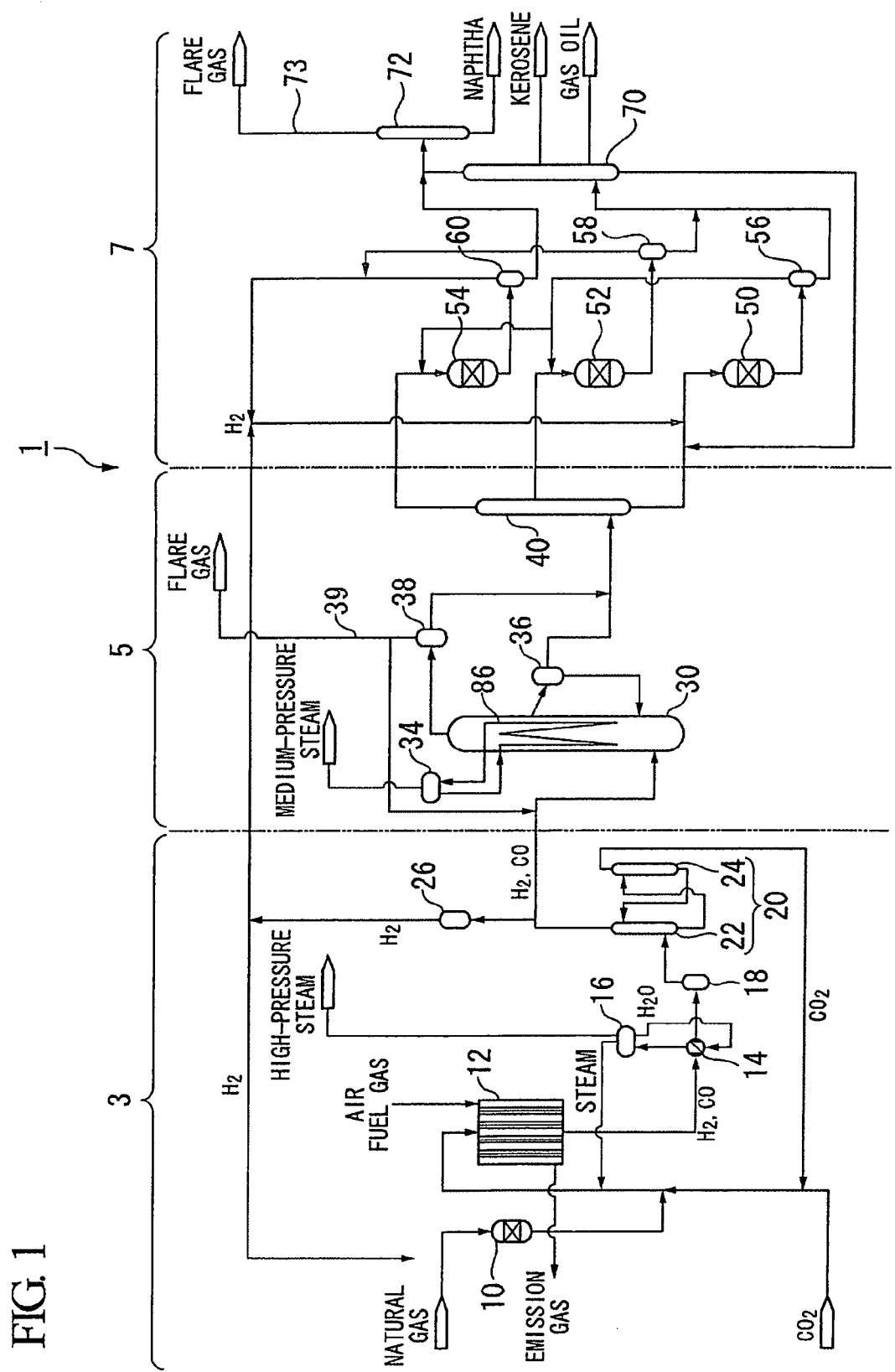
FIG. 1 is a schematic diagram showing the overall configuration of a liquid-fuel synthesizing system according to a first embodiment of the present invention.

Hereinafter, a first embodiment of the present invention will be described in detail with reference to the accompanying drawings. In addition, in the present specification and drawings, duplicate description is omitted by giving the same reference numerals to constituent elements having substantially the same functional configurations.

First, with reference to FIG. 1, the overall configuration and process of a liquid-fuel synthesizing system 1 which carries out a GTL (Gas to Liquids) process according to the present embodiment will be described. FIG. 1 is a schematic view showing the overall configuration of the liquid-fuel synthesizing system 1 according to the embodiment.

As shown in FIG. 1, the liquid-fuel synthesizing system 1 according to the present embodiment is a plant facility which carries out the GTL process which converts a hydrocarbon feedstock, such as a natural gas, into liquid fuels. This liquid-fuel synthesizing system 1 includes a synthesis gas production unit 3, an FT synthesis unit 5, and an upgrading unit 7. The synthesis gas production unit 3 reforms a natural gas, which is a hydrocarbon feedstock, to produce a synthesis gas including a carbon monoxide gas and a hydrogen gas. The FT synthesis unit 5 produces liquid hydrocarbons from the produced synthesis gas by the FT synthesis reaction. The upgrading unit 7 hydrogenates and refines the liquid hydrocarbons produced by the FT synthesis reaction to produce liquid fuel products (naphtha, kerosene, gas oil, wax, etc.). Hereinafter, components of each these respective units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26. The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced in the reformer 12, to produce a high-pressure steam. The vapor-liquid separator 16 separates the water heated by heat exchange with the synthesis gas in the waste heat boiler 14 into a vapor (high-pressure steam) and a liquid. The vapor-liquid separator 18 removes a condensate from the synthesis gas cooled down in the waste heat boiler 14, and supplies a gas component to the $CO_2$ removal unit 20. The $CO_2$ removal unit 20 has an absorption tower 22 which removes a carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (POX) using oxygen, an autothermal reforming method (ATR) that is a combination of the partial oxidation method and the steam reforming method, a carbon-dioxide-gas reforming method, and the like can also be utilized.

$$CH_4 + H_2O \rightarrow CO + 3H_2 \qquad (1)$$

$$CH_4 + CO_2 \rightarrow 2CO + 2H_2 \qquad (2)$$

Further, the hydrogen separator 26 is provided on a line branched from a main pipe which connects the $CO_2$ removal unit 20 or vapor-liquid separator 18 with the bubble column reactor (reactor) 30. This hydrogen separator 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption columns (not shown) which is arranged in parallel. By sequentially repeating processes including pressurizing, adsorption, desorption (pressure reduction), and purging of a hydrogen in each of the adsorption columns, a high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating hydrogen gas using a hydrogen storing alloy (TiFe, LaNi$_5$, TiFe$_{0.7-0.9}$, Mn$_{0.3-0.1}$, TiMn$_{1.5}$, etc.) having a property which adsorbs or emits hydrogen by being cooled or heated. By providing a plurality of adsorption columns in which a hydrogen storing alloy is contained, and alternately repeating, in each of the adsorption columns, adsorption of a hydrogen by cooling of the hydrogen storing alloy and emission of a hydrogen by heating of the hydrogen storing alloy, a hydrogen gas in the synthesis gas can be separated and recovered.

Further, the membrane separation method is a technique of separating a hydrogen gas having excellent membrane permeability out of mixed gas, using a membrane made of a polymeric material, such as aromatic polyimide. Since this membrane separation method is not accompanied with a phase change, less energy for running is required, and the running cost is low. Further, since the structure of a membrane separation device is simple and compact, the facility cost required is low, and the facility area required is small. Moreover, since there is no driving device in a separation membrane, and a stable running range is wide, there is an advantage in that maintenance and management is easy.

Next, the FT synthesis unit 5 will be described. The FT synthesis unit 5 mainly includes, for example the bubble column reactor 30, a vapor-liquid separator 34, a separator 36, a vapor-liquid separator 38, and a first fractionator 40.

The bubble column reactor 30 carries out the FT synthesis reaction of the synthesis gas produced in the above synthesis gas production unit 3, i.e., a carbon monoxide gas and a hydrogen gas, to produce liquid hydrocarbons. The vapor-liquid separator 34 separates the water flowed and heated through a heat transfer pipe 32 disposed in the bubble column reactor 30 into a steam (medium-pressure steam) and a liquid. The separator 36 is connected to a middle part of the bubble column reactor 30 to separate a catalyst and a liquid hydrocarbon product. The vapor-liquid separator 38 is connected to the top of the bubble column reactor 30 to cool down an unreacted synthesis gas and a gaseous hydrocarbon product. The first fractionator 40 distills the liquid hydrocarbons supplied via the separator 36 and the vapor-liquid separator 38 from the bubble column reactor 30; it separates and refines the liquid hydrocarbons into individual fractions according to boiling points.

Among them, the bubble column reactor 30, which is an example of a reactor which synthesizes liquid hydrocarbons from a synthesis gas, functions as an FT synthesis reactor which synthesizes liquid hydrocarbons from a synthesis gas by the FT synthesis reaction. This bubble column reactor 30 is composed of, for example, a bubble column slurry bed type reactor in which a slurry consisting of a catalyst and medium oil is contained inside a column vessel. This bubble column reactor 30 produces liquid hydrocarbons from a synthesis gas by the FT synthesis reaction. In detail, the synthesis gas supplied to the bubble column reactor 30 passes through the slurry consisting of a catalyst and medium oil, and in a suspended state, hydrogen gas and carbon monoxide gas undergo a synthesis reaction, as shown in the following chemical reaction formula (3).

$$2nH_2 + nCO \rightarrow (-CH_2-)_n + nH_2O \qquad (3)$$

Since this FT synthesis reaction is an exothermic reaction, the bubble column reactor 30, which is a heat exchanger type reactor within which the heat transfer pipe 32 is disposed, is adapted such that, for example, water (BFW: Boiler Feed Water) is supplied as a coolant so that the reaction heat of the above FT synthesis reaction can be recovered as a medium-pressure steam by heat exchange between the slurry and water.

Finally, the upgrading unit 7 will be described. The upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to the bottom of the first fractionator 40. The kerosene and gas oil fraction hydrotreating reactor 52 is connected to the middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70. Then the naphtha stabilizer 72 discharges a butane and components lighter than butane as flare gas, and separates and recovers components having a carbon number of five or more as a naphtha product.

Next, a process (GTL process) of synthesizing liquid fuels from a natural gas by the liquid-fuel synthesizing system 1 configured as above will be described.

A natural gas (whose main component is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as the main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing natural gas in advance in this way, it is possible to prevent deactivation of catalysts used in the reformer 12, the bubble column reactor 30, etc. by sulfur components.

The natural gas (may also contain carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed therewith. The reformer 12 reforms a natural gas by using a carbon dioxide and a steam to produce a high-temperature synthesis gas including a carbon monoxide gas and a hydrogen gas as the main components, by a steam and carbon-dioxide-gas reforming method. At this time, the reformer 12 is supplied with, for example, a fuel gas for a burner disposed in the reformer 12 and air, and reaction heat required for the above steam and $CO_2$ reforming reaction, which is an endothermic reaction, is provided with the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after a condensate is separated and removed from the synthesis gas in the gas-liquid separator 18. The absorption tower 22 absorbs a carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, a steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2:CO=2:1$ (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform predetermined reactions utilizing the hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas from which a carbon dioxide gas has been separated in the above $CO_2$ removal unit 20 flows into the bubble column reactor 30, and passes through the catalyst slurry contained in the bubble column reactor 30. At this time, within the bubble column reactor 30, the carbon monoxide and hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and the water heated by this heat exchange is vaporized into steam. As for this steam, the water liquefied in the vapor-liquid separator 34 is returned to the heat transfer pipe 32, and a gas component is supplied to an external device as a medium-pressure steam (for example, 1.0 to 2.5 MPaG).

The liquid hydrocarbons synthesized in the bubble column reactor 30 in this way are extracted from the middle part of the bubble column reactor 30, and are flowed to the separator 36. The separator 36 separates a catalyst (solid component) and a liquid component including a liquid hydrocarbon product in the extracted slurry. A part of the separated catalyst is returned to the bubble column reactor 30, and the liquid component is supplied to the first fractionator 40. From the top of the bubble column reactor 30, an unreacted synthesis gas, and a gas component of the synthesized hydrocarbons are introduced into the vapor-liquid separator 38. The vapor-liquid separator 38 cools down these gases to separate some condensed liquid hydrocarbons to introduce them into the first fractionator 40. Meanwhile, as for the gas component separated in the vapor-liquid separator 38, the unreacted synthesis gas (CO and $H_2$) is returned into the bubble column reactor 30, and is reused for the FT synthesis reaction. Further, the emission gas (flare gas) other than the target products, including as the main component hydrocarbon gas having a small carbon number ($C_4$ or less), is introduced into an external combustion facility (not shown), is combusted therein, and is then emitted to the atmosphere.

Next, the first fractionator 40 heats the liquid hydrocarbons (whose carbon numbers are various) supplied via the separator 36 and the gas-liquid separator 38 from the bubble column reactor 30 as described above, to fractionally distill the liquid hydrocarbons using a difference in boiling points. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are transferred to the wax fraction hydrocracking reactor 50, the liquid hydrocarbons (mainly $C_{11}$ to $C_{20}$) as the kerosene and gas oil fraction drawn from the middle part of the first fractionator 40 are transferred to the kerosene and gas oil fraction hydrotreating reactor 52, and the liquid hydrocarbons (mainly $C_5$ to $C_{10}$) as the naphtha fraction drawn from the upper part of the first fractionator 40 are transferred to the naphtha fraction hydrotreating reactor 54.

The wax fraction hydrocracking reactor 50 hydrocracks the liquid hydrocarbons as the wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving the C—C bonds of the hydrocarbons with a large carbon number, using a catalyst and heat. A product including the liquid hydrocarbons hydrocracked in this wax fraction hydrocracking reactor 50 is separated into a gas and a liquid in the vapor-liquid separator 56, the liquid hydrocarbons of which are transferred to the second fractionator 70, and the gas component (including a hydrogen gas) of which is transferred to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$) as the kerosene and gas oil fractions having an approximately medium carbon number, which have been supplied from the middle part of the first fractionator 40, by using the hydrogen gas supplied via the wax fraction hydrocracking reactor 50 from the hydrogen separator 26. In this hydrotreating reaction, in order to obtain mainly branched chain saturated hydrocarbons, the liquid hydrocarbons are isomerized, and a hydrogen is added to the unsaturated bonds of the above liquid hydrocarbons to saturate the liquid hydrocarbons. As a result, a product including the hydrotreated liquid hydrocarbons is separated into a gas and a liquid in the gas-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats liquid hydrocarbons (approximately $C_{10}$ or less) as the naphtha fraction with a low carbon number, which have been supplied from the upper part of the first fractionator 40, by using the hydrogen gas supplied via the wax fraction hydrocracking reactor 50 from the hydrogen separator 26. As a result, a product including the hydrotreated liquid hydrocarbons is separated into gas and liquid in the vapor-liquid separator 60, the liquid hydrocarbons of which are transferred to the naphtha stabilizer 72, and the gas component (including a hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is less than about 150° C.) with a carbon number of $C_{10}$ or less, kerosene (whose boiling point is about 150 to 250° C.), gas oil (whose boiling point is about 250 to 350° C.), and uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, hydrocarbon with a carbon number of $C_{10}$ or less is drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, high-purity naphtha is drawn from a lower part of the naphtha stabilizer 72. Meanwhile, the emission gas (flare gas) other than products, which contains as the main component hydrocarbons with a predetermined carbon number or less ($C_4$ or less), is discharged from the top of the naphtha stabilizer 72.

The process (GTL process) of the liquid fuel synthesizing system 1 has been described above. By the GTL process concerned, a natural gas can be easily and economically converted into clean liquid fuels, such as high-purity naphtha ($C_5$ to $C_{10}$), kerosene ($C_{11}$ to $C_{15}$), and gas oil ($C_{16}$ to $C_{20}$). Moreover, in the present embodiment, the above steam and carbon-dioxide-gas reforming method is adopted in the reformer 12. Thus, there are advantages in that a carbon dioxide contained in a natural gas, which is feedback, can be effectively utilized, the composition ratio of the synthesis gas suitable for the above FT synthesis reaction can be efficiently attained by a single reaction in the reformer 12, and a hydrogen concentration adjustor, etc. is unnecessary.

Figure 2:
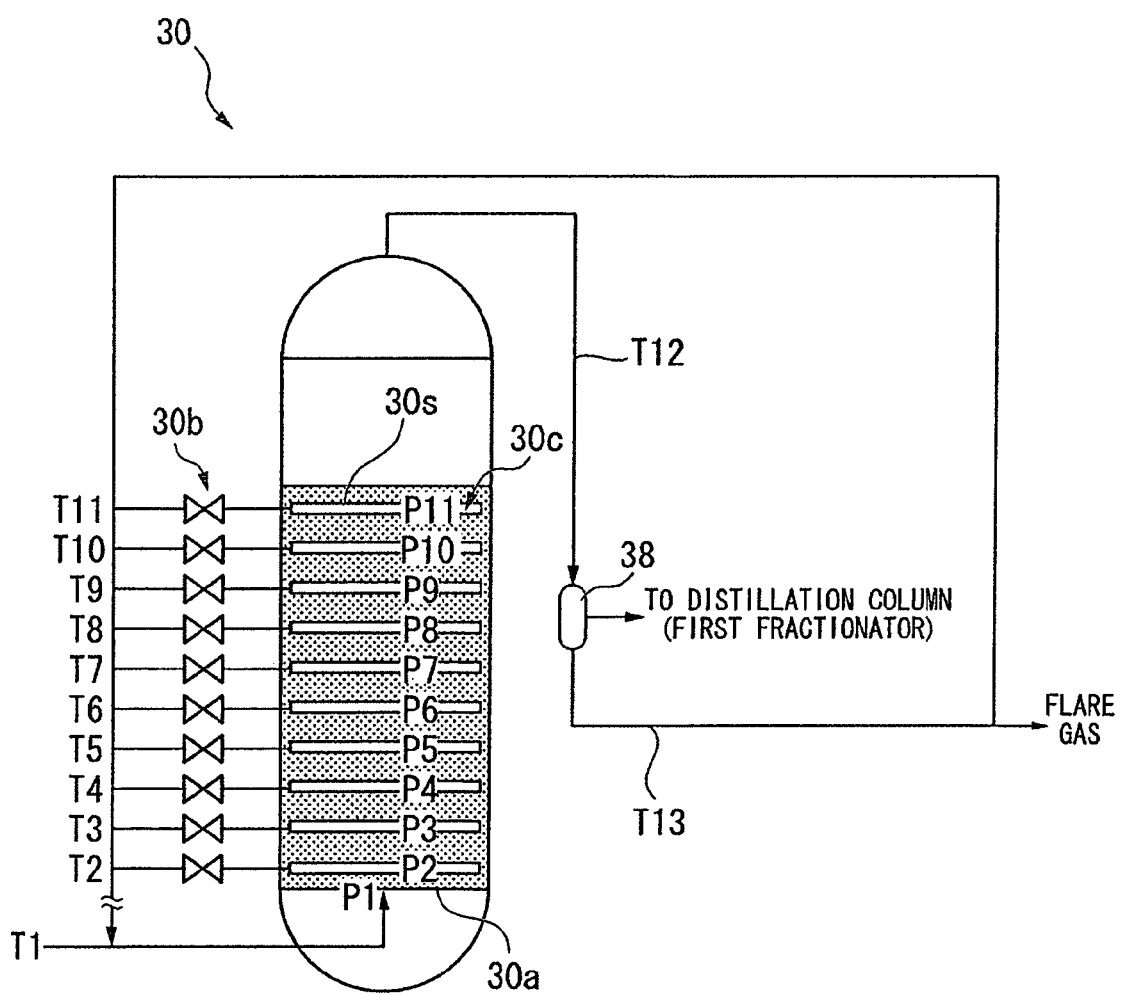
FIG. 2 is a schematic diagram showing the configuration of a bubble column reactor according to this embodiment.

Next, the configuration of the bubble column reactor 30 will be described. FIG. 2 is a view schematically showing the configuration of the bubble column reactor 30. In FIG. 2, for convenience of description, the illustration of some of the constituent elements is omitted.

As shown in FIG. 2, the bubble column reactor 30 has a sparger 30a at the bottom thereof, and a slurry 30s is contained in the reactor. Supply lines T1 to T11 are connected to the bubble column reactor 30. The synthesis gas is supplied to the bubble column reactor 30 via the supply lines T1 to T11.

The supply line T1 is connected to the sparger 30a at the bottom of the bubble column reactor 30. The upstream of the supply line T1 is connected to, for example, a pipe with which the above compressor (not shown) is provided. The synthesis gas which flows through the supply line T1 is supplied to the inside of the bubble column reactor 30 via the sparger 30a. The sparger 30a becomes the first supply device of the present invention, and the position where the sparger 30a and the supply line T1 are connected together is defined as a connecting position P1. When the synthesis gas is supplied, the synthesis gas always flows through the supply line T1.

The supply lines T2 to T11 are connected to a side of the bubble column reactor 30 at a position above the supply line T1. The supply lines T2 to T11 are connected to the bubble column reactor 30 at different heights respectively so that the synthesis gas can be supplied to the bubble column reactor 30 from ten-level height positions by the supply lines T2 to T11. The supply lines T2 to T11 are connected, for example, at substantially equal intervals in the vertical direction. In this embodiment, the supply line T2 is connected to the lowest position of the side of the bubble column reactor 30, and the supply line T11 is connected to the highest position.

The ends of the supply lines T2 to T11 are respectively connected to internal tubes 30c provided within the bubble column reactor 30. The internal tubes 30c connected to the supply lines T2 to T11, respectively, are provided in almost the same height positions as the supply lines T2 to T11. Therefore, the internal tubes 30c are disposed at substantially equal intervals in the vertical direction similarly to the supply lines T2 to T11. The synthesis gas is supplied into the slurry 30s contained in the bubble column reactor 30 via the supply lines T2 to T11 and the internal tubes 30c.

Figure 3A:
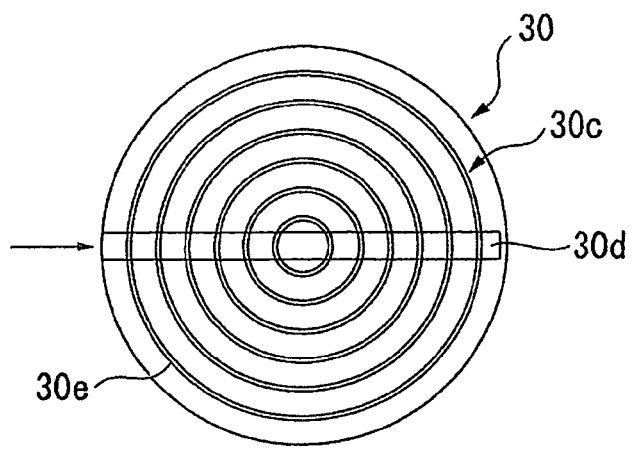
FIG. 3A is a cross-sectional view showing the configuration of the bubble column reactor according to this embodiment.
Figure 3B:
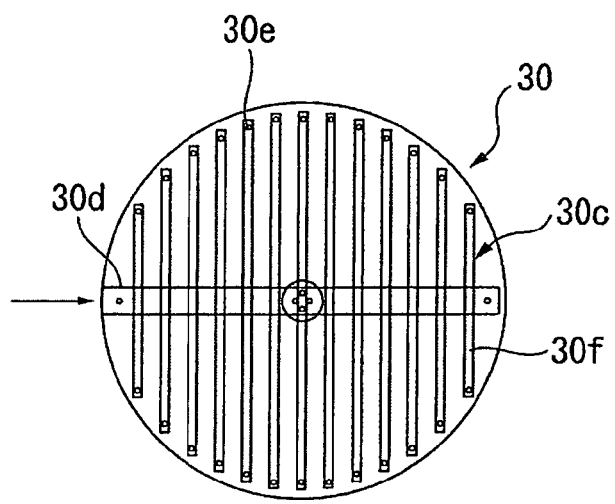
FIG. 3B is a cross-sectional view showing the configuration of the bubble column reactor according to this embodiment.
Figure 3C:
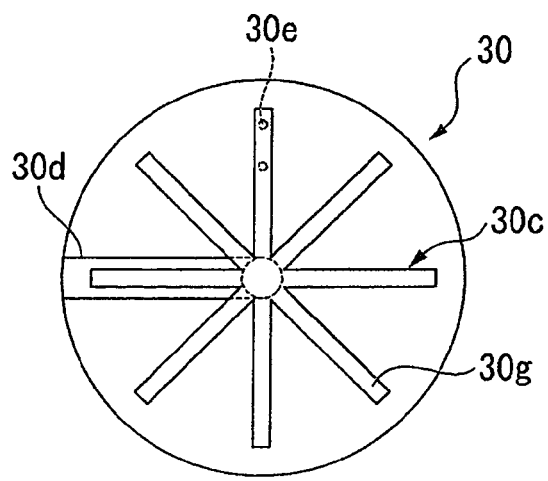
FIG. 3C is a cross-sectional view showing the configuration of the bubble column reactor according to this embodiment.

FIGS. 3A to 3C are views schematically showing the cross-section of the position of the bubble column reactor 30 where the internal tubes 30c are provided. Each of FIGS. 3A to 3C shows a configuration example of the internal tubes 30c. As shown in FIGS. 3A to 3C, each internal tube 30c has a plurality of gas supply ports 30e. The plurality of gas supply ports 30e is provided so that their positions in vertical direction become the same. Each internal tube 30c is connected to a trunk part provided so as to pass through the center of the bubble column reactor 30 in plan view. The synthesis gas supplied from the supply lines T2 to T11 is supplied into the bubble column reactor 30 from the above gas supply ports 30e via the trunk part 30d. That is, the heights at which the plurality of gas supply ports 30e is provided in each internal tube 30c are the heights at which the second supply devices P2 to P11 are provided in the present invention (refer to FIG. 2). Accordingly, in this embodiment, a plurality of second supply devices is disposed at ten levels in the vertical direction, and the internal tubes 30c which have the gas supply ports 30e are disposed at ten levels in the vertical direction.

A plurality of internal tubes 30c shown in FIG. 3A is annularly formed in plan view, and is provided concentrically with the bubble column reactor 30. A plurality of gas supply ports 30e is provided annularly along each internal tube 30c. That is, the plurality of gas supply ports 30e is provided along a cylindrical shape that is the cross-sectional shape of the bubble column reactor 30.

In the configuration shown in FIG. 3B, a plurality of branch parts 30f is provided in a direction orthogonal to the trunk part 30d in plan view. That is, the plurality of branch parts 30f horizontally extends from the trunk part 30d. The branch parts 30f are formed in a comblike shape in plan view, and a plurality of gas supply ports 30e is provided along each branch part 30f provided in a comblike shape in plan view. Further, a plurality of gas supply ports 30e is also provided in the trunk part 30d.

In the configuration shown in FIG. 3C, the trunk part 30d is provided to the central part of the bubble column reactor 30 in plan view, and branch parts 30g are radially formed in the radial direction towards the outer periphery of the bubble column reactor 30 from the central part. A plurality of gas supply ports 30e is provided along each branch part 30g.

The shapes and arrangements of the gas supply ports 30e shown in FIGS. 3A to 3C may be the same as, for example, the shape of a gas supply part in the sparger 30b provided at the bottom of the bubble column reactor 30. Each of the internal tubes 30c provided in the each position in the vertical direction may be any of the configurations shown in FIGS. 3A to 3C. All of the internal tubes 30c may have the same configuration, and may have different configurations, respectively.

As shown in FIG. 2, valves 30b which can adjust opening degree are attached to the supply lines T2 to T11, respectively. By adjusting the opening degree of the valves 30b, the flow rate of the synthesis gas supplied from the gas supply ports 30e can be adjusted. By setting the opening degree of the valves 30b to zero (bringing the valves 30b into a closed state), the supply of the synthesis gas by the supply lines can be cut off. The opening degree of the valve 30b in each of the supply lines T2 to T11 can be independently controlled by, for example, a control device (not shown), etc.

The flow line T12 is connected to the top of the bubble column reactor 30. The flow line T12 is a pipe which allows the unreacted synthesis gas and the gas component of synthesized hydrocarbons to flow therethrough. The flow line T12 is connected to the vapor-liquid separator 38. The flow line T13 is connected to the vapor-liquid separator 38. The flow line T13 is a pipe in which the synthesis gas separated by the vapor-liquid separator 38 flows therethrough, and is connected to the supply lines T2 to T11. The unreacted synthesis gas which has not reacted within the bubble column reactor 30 passes through the flow line T12, the vapor-liquid separator 38, and the flow line T13, is returned to the bubble column reactor 30 via the supply lines T2 to T11, and is reused for the FT synthesis reaction. As such, the unreacted synthesis gas flows through the supply lines T2 to T11.

In addition, the flow line T13 connected to the supply lines T2 to T11 may be connected also to the supply line T1. When such a configuration is adopted, for example, a valve (not shown), etc. may be attached to the flow line T13. According to this configuration, for example, the flow rate of the synthesis gas supplied to the supply line T1 can be adjusted, or switching of the connection between the flow line T13 and the supply line T1 can be performed by adjusting the opening degree of the valve.

When liquid fuels are synthesized using the above bubble column reactor 30, the synthesis gas generated by the synthesis gas production unit 3 is supplied to the bubble column reactor 30 from the supply line T1, and simultaneously the synthesis gas is supplied to the bubble column reactor 30 even from the supply lines T2 to T11 (synthesis gas supply step). The synthesis gas supplied to the bubble column reactor 30 passes through the inside of the slurry 30s contained in the bubble column reactor 30, and the above-mentioned FT synthesis reaction proceeds (synthesizing step). By the FT synthesis reaction, the carbon monoxide and hydrogen gas which are included in the synthesis gas react with each other, thereby producing hydrocarbons.

In this embodiment, in the supply step, the synthesis gas is supplied from a path via the supply line T1, and the unreacted synthesis gas is also supplied from paths via the supply lines T2 to T11.

Since the internal tubes 30c connected to the supply lines T2 to T11, respectively, are equally disposed with respect to the height of the slurry 30s contained within the bubble column reactor 30, the synthesis gas is uniformly supplied to the inside of the slurry 30s in the vertical direction. Further, since the gas supply ports 30e are formed over the whole cross-section inside of the bubble column reactor 30 in plan view, the partial pressure of the synthesis gas becomes more uniform even in a horizontal direction. In the synthesizing step, the synthesis gas uniformly supplied in the vertical direction and in the horizontal direction, respectively, brings a uniform synthesis reaction over the whole vertical direction and whole horizontal direction in the slurry 30s.

In the above synthesis gas supply step, by adjusting the opening degree of the valves 30b attached to the supply lines T2 to T11, the flow rate of the synthesis gas is controlled so that the gas superficial velocity in the bubble column reactor 30 becomes preferably within a range of 0.04 m/s to 0.3 m/s, and more preferably within a range of 0.1 m/s to 0.2 m/s, in the synthesizing step. If the gas superficial velocity of the bubble column reactor 30 becomes smaller than 0.04 m/s, the accumulation of the catalyst inside the reactor is caused by the downward precipitation of the catalyst particles within the slurry 30s, and the reaction efficiency of the synthesis reaction is lowered considerably. Further, if the gas superficial velocity exceeds 0.3 m/s, the synthesis gas existing in the slurry 30s increases excessively with respect to the volume of the slurry 30s contained within the reactor 30. Thereby, the efficiency of heat transfer is lowered, and the cooling efficiency for removing the reaction heat degrades. In this embodiment, such an adverse effect is avoided by setting the value of the gas superficial velocity in the bubble column reactor 30 to a value within a range of the above 0.04 m/s to 0.3 m/s. Further, the reaction rate can be made higher, and the synthesis reaction can be more efficiently performed by setting the value of the gas superficial velocity to particularly a value within a range of 0.1 m/s to 0.2 m/s among the values within the above range.

Which supply lines to be used for supplying the synthesis gas among the supply lines T2 to T11 is determined in advance on the basis of the gas superficial velocity in the bubble column reactor 30. For example, first, the amount of decrease of the gas superficial velocity accompanying a reaction from the lower part of the slurry 30s to the upper part thereof, in case the synthesis gas is supplied only from the bottom of the bubble column reactor 30, is obtained. Next, simulations, experiments, etc. are performed so that the optimal conditions under which the amount of decrease of the gas superficial velocity can be compensated for and the gas superficial velocity within the bubble column reactor 30 can be made uniform are obtained.

The optimal conditions include, for example, the selection of the supply lines T2 to T11, the setting of the flow rates of the synthesis gas to be supplied from the selected supply lines T2 to T11, etc. In the simulations or experiments which are performed in advance, it is preferable to select supply lines and at the same time to obtain the optimal values of the amount of supply (flow rate) of the synthesis gas from the selected supply lines. When obtaining the optimal conditions, the preconditions include, for example, that the gas superficial velocity in the bubble column reactor 30 in the synthesizing step falls within the range of the above 0.04 m/s to 0.3 m/s etc, and more preferably within the range of 0.1 m/s to 0.2 m/s.

As for the supply lines and the flow rates of the synthesis gas selected on the basis of the above simulations or experiments, for example, a plurality of patterns is assumed as combinations of supply lines, such as the case where the synthesis gas is supplied using all the supply lines T2 to T11, or the case where the synthesis gas is supplied using some of the supply lines T2 to T11. Further, according to the combinations of the supply lines, a plurality of patterns can be assumed as the pattern of the flow rates of the synthesis gas to be supplied from the supply lines. As for the selected supply lines and flow rates of the synthesis gas, a plurality of patterns may be obtained in advance so that the appropriate patterns may be used according to the circumstances. The concrete results of the simulations and experiments will be described in the section of a separate embodiment.

As described above, according to this embodiment, the synthesis gas is supplied to the bubble column reactor 30 from the several supply device P1 to P11 having different heights. Thus, compared with the case where the synthesis gas is supplied only from the bottom of the bubble column reactor 30, the partial pressure of the synthesis gas in the bubble column reactor becomes more uniform. Thereby, it is possible to make the reaction rate of a synthesis reaction uniform in the whole bubble column reactor 30, and it is possible to synthesize liquid fuels efficiently. In addition, in this embodiment, since the synthesis gas can be uniformly supplied to the whole bubble column reactor 30 and liquid fuels can be efficiently synthesized, the bubble column reactor 30 itself can be compact.

Second Embodiment

Next, a second embodiment of the present invention will be described. The same components as those of the above embodiment are denoted by the same reference numerals, and the description thereof is omitted. Since the configuration of the supply lines T2 to T11 and the flow line T13 in this embodiment differs from that of the first embodiment, this point will be the main focus of the description.

Figure 4:
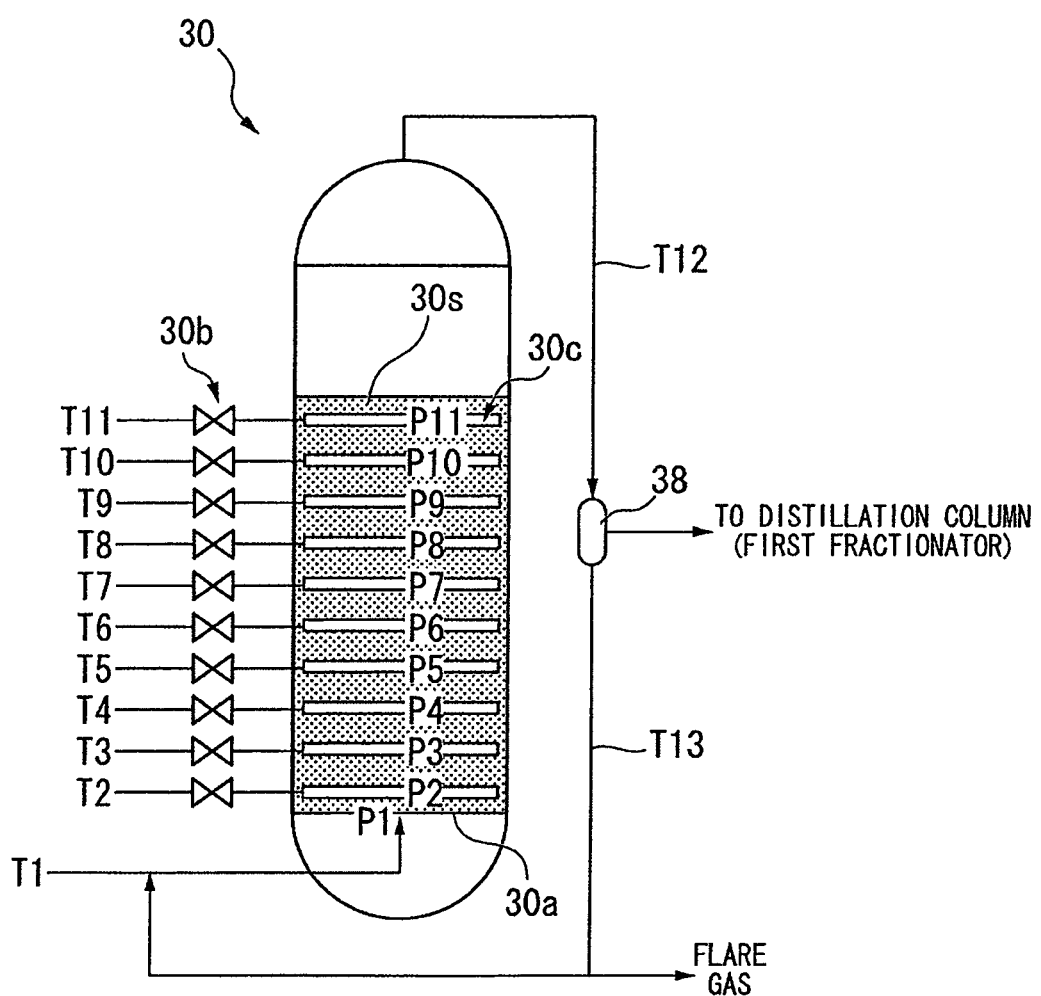
FIG. 4 is a schematic diagram showing the overall configuration of a bubble column reactor according to a second embodiment of the present invention.

FIG. 4 is a view schematically showing the configuration of the bubble column reactor 30 according to this embodiment.

As shown in this drawing, in this embodiment, the supply lines T1 to T11 are provided so as to branch from a pipe with which the above compressor (not shown) is provided. Further, the flow line T13 which allows the unreacted synthesis gas separated by the vapor-liquid separator 38 to flow therethrough is connected only to the supply line T1.

By this configuration, the synthesis gas flows through the supply lines T2 to T11 directly from the compressor and the synthesis gas is supplied to the supply device P2 to P11 of the bubble column reactor 30 via the supply lines T2 to T11. By adjusting the opening degree of the valves 30b attached to the supply lines T2 to T11, respectively, the flow rate of the unreacted synthesis gas can be suitably adjusted, and a desired quantity of the synthesis gas can be supplied to the supply device P2 to P11, respectively.

Working Examples

Next, working examples of the present invention will be described. In these working examples, results of the simulation performed in the above embodiment, i.e., combinations of patterns of selection of the supply lines T1 to T11 and the flow line T13 which supply the synthesis gas to the bubble column reactor 30, and the flow rates of the selected supply lines, will be described. In the working examples, the bubble column reactor 30 of the first embodiment in which the flow line T13 is connected to the supply line T1 will be described as an example.

Table 1 is a table showing combinations between patterns of selection of the supply lines T1 to T11, and the flow rates of the synthesis gas supplied to the bubble column reactor 30 from the supply lines T1 to T11 and the flow line T13. In this table, the flow rates of respective supply lines are shown by the ratio when the flow rate of the supply line T1 before the unreacted synthesis gas is supplied via the flow line T13 is set to 100.

TABLE 1

| Supply line | Comparative Example | Working Example 1 | Working Example 2 | Working Example 3 | Working Example 4 |
|---|---|---|---|---|---|
| T13 | 107 | 56.8 | 56.0 | 56.7 | 60.3 |
| T11 | 0 | 5.4 | 10.3 | 12.4 | 0 |
| T10 | 0 | 5.3 | 0 | 0 | 0 |
| T9 | 0 | 5.2 | 8.6 | 0 | 0 |
| T8 | 0 | 5.1 | 8.3 | 19.5 | 23.3 |
| T7 | 0 | 5.0 | 0 | 0 | 0 |
| T6 | 0 | 5.0 | 8.1 | 0 | 0 |
| T5 | 0 | 4.9 | 0 | 0 | 0 |
| T4 | 0 | 4.8 | 7.9 | 18.3 | 23.3 |
| T3 | 0 | 4.7 | 0 | 0 | 0 |
| T2 | 0 | 4.6 | 7.7 | 0 | 0 |
| T1 | 100 | 100 | 100 | 100 | 100 |

As shown in this table, the conventional configuration is a configuration in which the synthesis gas is supplied only from the bottom of the bubble column reactor 30 similarly to the comparative example in the table. On the other hand, Working Examples 1 to 4 of the present invention have a configuration in which the synthesis gas is supplied via the supply lines T2 to T11 from the side of the bubble column reactor 30 as well.

For example, Working Example 1 is an example of the flow rates when the synthesis gas is supplied from all the supply lines of the supply lines T2 to T11. In this case, the synthesis gas is supplied at a flow rate with the highest ratio in the supply line T11, and is supplied while gradually reducing the flow rate ratio on reaching lower supply lines of the bubble column reactor 30.

Further, for example, as shown in Working Examples 2 to 4, the synthesis gas can also be supplied from some supply lines of the supply lines T2 to T11. For example, Working Example 2 is an example in which the synthesis gas is supplied using six supply lines including the supply lines T2, T4, T6, T8, T9, and T11. In this case, the number of supply lines to be used is decreased compared with Working Example 1, and the flow rate of the synthesis gas to be supplied from each supply line is increased accordingly. Even in Working Example 2, the synthesis gas is supplied at the highest flow rate in the uppermost supply line T11 among the six supply lines to be used for the supply of the synthesis gas, and is supplied while gradually reducing the flow rate on reaching the lower supply lines.

Further, for example, Working Example 3 is an example in which the synthesis gas is supplied using three supply lines T4, T8, and T11. In this case, the number of supply lines to be used further is decreased compared with Working Example 2, and the flow rate of the synthesis gas to be supplied from each supply line is increased accordingly. In Working Example 3, the synthesis gas is supplied at the lowest flow rate in the uppermost supply line T11 among the three supply lines to be used for the supply of the synthesis gas, and is supplied at the highest flow rate in the middle supply line T8 in the vertical direction.

Further, for example, Working Example 4 is an example in which the synthesis gas is supplied using two supply lines T4 and T8. In this case, the number of supply lines to be used is small compared with the above working examples, and the flow rate of the synthesis gas to be supplied from each supply line is increased accordingly. In Working Example 4, the synthesis gas is supplied at the same flow rate from two supply lines used for the supply, of the synthesis gas.

The ratios of the flow rate of the synthesis gas shown in the respective working examples may be applied to, for example, the configuration of the second embodiment as well as the bubble column reactor 30 including the configuration of the above first embodiment.

As such, by selecting supply lines and setting the flow rates from the selected supply lines similarly to Working Examples 1 to 4 shown in Table 1, the synthesis reaction in the bubble column reactor 30 can be more efficiently performed.

INDUSTRIAL APPLICABILITY

According to the liquid-fuel synthesizing method and liquid-fuel synthesizing apparatus according to the present invention, it is possible to synthesize liquid fuels efficiently.

DESCRIPTION OF REFERENCE NUMERALS

1: LIQUID-FUEL SYNTHESIZING SYSTEM
3: SYNTHESIS GAS PRODUCTION UNIT
5: FT SYNTHESIS UNIT
7: UPGRADING UNIT
30: BUBBLE COLUMN REACTOR
30*a*: SPARGER
30*b*: VALVE
30*c*: INTERNAL TUBE
30*d*: TRUNK PART
30*e*: SUPPLY PORT
30*f*, 30*g*: BRANCH PART
T1 to T11: SUPPLY LINE
T13: FLOW LINE
P1 to P11: SUPPLY DEVICE (FIRST SUPPLY DEVICE AND SECOND SUPPLY DEVICE)

The invention claimed is:

1. A liquid-fuel synthesizing apparatus comprising:
a reactor configured to synthesize liquid fuels using a Fischer-Tropsch synthesis reaction in which a synthesis gas including a carbon monoxide gas and a hydrogen gas as the main components and a slurry having solid catalyst particles suspended in a liquid react with each other in the reactor;
a plurality of supply devices which includes a first supply device provided at the bottom of the reactor and second supply devices each provided at the reactor at a height different from the first supply device, wherein the second supply devices are connected to the reactor at substantially equal intervals in a vertical direction,
a first flow line connected to a top of the reactor,
a vapor-liquid separator to which the first flow line is connected, and
a second flow line connected to the vapor-liquid separator and connected to only the first supply device among the supply devices, wherein
valves are respectively attached to the second supply devices so that a flow rate of the synthesis gas supplied from each of the second supply devices is individually adjusted via the valves,
the synthesis gas is supplied to the reactor from the first supply device and the second supply devices,
and wherein:
the plurality of supply devices is configured to supply the synthesis gas so that the gas superficial velocity in the reactor is within a range of 0.04 m/s to 0.3 m/s, and
each of the second supply devices are configured to supply the synthesis gas to the reactor at the same flow rate, the flow rate being determined by:
obtaining an amount of decrease of a gas superficial velocity in the slurry accompanying a reaction from the lower part to the upper part of the reactor, when the synthesis gas is supplied only from the first supply device; and
performing simulations or experiments to obtain the flow rate by which the amount of decrease of the gas superficial velocity can be compensated for and the gas superficial velocity within the reactor can be made uniform.

2. The liquid-fuel synthesizing apparatus according to claim 1, wherein the plurality of supply devices is configured to supply the synthesis gas so that the gas superficial velocity in the reactor is within a range of 0.1 m/s to 0.2 m/s.

3. The liquid-fuel synthesizing apparatus according to claim 1, wherein
each of the second supply devices has a plurality of supply ports provided on a cross-section of the reactor.

4. The liquid-fuel synthesizing apparatus according to claim 3, wherein
each of the second supply devices includes: a trunk part provided so as to pass through a center of the reactor; and a plurality of internal tubes which is connected to the trunk part, is annularly formed concentrically with the reactor, and differs in diameter, and
the plurality of supply ports is formed in the plurality of internal tubes.

5. The liquid-fuel synthesizing apparatus according to claim 3, wherein
each of the second supply devices includes: a trunk part provided so as to pass through a center of the reactor; and a plurality of branch parts which extends horizontally from the trunk part, and
the plurality of supply ports is formed in the plurality of branch parts.

6. The liquid-fuel synthesizing apparatus according to claim 1, wherein
each of the second supply devices includes: a trunk part provided so as to pass through a center of the reactor and extend horizontally; and a plurality of branch parts extend horizontally from the trunk part so as to be perpendicular to the trunk part and be parallel to each other, and a plurality of supply ports are formed in the plurality of branch parts.

\* \* \* \* \*